United States Patent [19]

Sewell et al.

[11] Patent Number: 4,583,338

[45] Date of Patent: Apr. 22, 1986

[54] DOOR PANEL CONSTRUCTION

[76] Inventors: James D. Sewell, 5005 Yarrow Ct., Fair Oaks, Calif. 95628; Norman E. Gordon, 7743 Claypool Way, Citrus Heights, Calif. 95610

[21] Appl. No.: 530,561

[22] Filed: Sep. 9, 1983

[51] Int. Cl.[4] .......................... E04C 2/36; E06B 3/74; B32B 3/12

[52] U.S. Cl. ........................................ 52/456; 52/455; 52/785; 52/806; 428/116

[58] Field of Search ................. 52/456, 455, 785, 790, 52/791, 792, 793, 794, 795, 806, 807; 428/116, 131

[56] References Cited

U.S. PATENT DOCUMENTS

| | | | |
|---|---|---|---|
| 2,695,430 | 11/1954 | Wakefield | 52/790 |
| 2,791,809 | 5/1957 | Lincoln, Jr. | 52/785 |
| 2,828,235 | 3/1958 | Holland et al. | 52/790 |
| 3,336,714 | 8/1967 | Vecchiarelli et al. | 52/475 |
| 3,704,563 | 12/1972 | Waller | 52/455 |
| 4,294,055 | 10/1981 | Andresen | 52/793 |

FOREIGN PATENT DOCUMENTS

| | | | |
|---|---|---|---|
| 853417 | 3/1940 | France | 52/793 |
| 1045484 | 11/1953 | France | 52/793 |
| 271011 | 5/1927 | United Kingdom | 52/790 |

*Primary Examiner*—Carl D. Friedman
*Assistant Examiner*—Michael Safavi
*Attorney, Agent, or Firm*—Lothrop & West

[57] ABSTRACT

A hollow door panel construction includes a rectangular frame of predetermined thickness assembled from side and end members defining an elongated enclosure. Within the enclosure are corrugated paperboard strips, having a width equal to the predetermined thickness. The strips are variously formed and attached to define a plurality of horizontal cell rows, vertically stacked to fill the framed volume. Each cell row spans the internal width of the frame, and includes a centrally positioned short-walled brace cell straddled on either side by a long-walled lateral cell. To complete the panel construction, thin sheets abut and are secured to the opposite faces of the frame and to the outer edges of the strips.

4 Claims, 3 Drawing Figures

TEST A

| PRIOR ART | PRESENT INVENTION |
|---|---|
| 12" DEEP<br>8 PLY CORRUGATED PAPERBOARD<br>9" CELL WALLS<br><br>3' SQUARE TEST SAMPLE<br><br>3831 lbs | 12" DEEP<br>8 PLY CORRUGATED PAPERBOARD<br>7.25" BRACE CELL WALLS<br>10.25" LATERAL CELL WALLS<br>3' SQUARE TEST SAMPLE<br><br>4071 lbs |

TEST B

| PRIOR ART | PRESENT INVENTION |
|---|---|
| 1 1/8" DEEP<br>18 PLY CORRUGATED PAPERBOARD<br>5.5" CELL WALLS<br><br>3' SQUARE TEST SAMPLE<br><br>5547 lbs | 1 1/8" DEEP<br>18 PLY CORRUGATED PAPERBOARD<br>4" BRACE CELL WALLS<br>6" LATERAL CELL WALLS<br>3' SQUARE TEST SAMPLE<br><br>7125 lbs |

*FIG. 3.*

DOOR PANEL CONSTRUCTION

BACKGROUND OF THE INVENTION

The invention relates generally to a hollow door construction employing a structural void filler for augmenting door strength. More specifically, the door panel herein includes a "honeycomb", multi-cellular void filler utilizing variable cell size to provide greater door strength than known prior art constructions.

Applicants are aware of the following references generally pertaining to door, or panel construction: U.S. Pat. Nos. 2,765,056, 10/02/56, Tyree; 2,824,630, 2/25/58, Tolman; 2,827,670, 3/25/58, Schwindt; 2,833,004, 5/06/58, Johnson et al.; 2,980,573, 4/18/61, Clifford; 4,130,682, 12/19/78, Lauko.

These references disclose a consistent or repeated cell configuration throughout the structural void filler. The Schwindt patent discloses and discusses a preferred construction using a higher concentration of cellular material in the vicinity of the longitudinal edges of the door, but this is accomplished by compressing the uniformly sized cells into a smaller volume than the remaining cells. As will become more apparent from the detailed description of the invention, the purpose, placement, and manner of accomplishing variable cell size in Schwindt is far removed from similar considerations of the invention herein.

Reference is also made to U.S. Pat. No. 4,372,717, issued to us on Feb. 8, 1983, disclosing a cellular void filler particularly adapted for filling voids within a container carrying articles of freight. This patent discloses a honeycomb cell construction designed to be manually expanded from a flat stack of strips into a relatively thick, structural void filler. The patented structure is further adapted to maintain an expanded configuration when freely suspended under its own weight. It is not directed towards a thin, rigid door panel construction designed for hinge suspension from a longitudinal frame edge.

SUMMARY OF THE INVENTION

A door panel construction includes a rectangular door panel frame enclosing and reinforced by a structural void filler formed from elongated corrugated paperboard strips of the same width as the frame thickness. The strips are folded and connected to each other to form a plurality of quadrangular cells, a first type characterized as brace cells and a second type characterized as lateral cells.

The brace cells are apex connected to form a series or line of brace cells disposed along the longitudinal center line of the door frame, extending from the top end to the bottom end of the door frame. The brace cells are also formed to have shorter cell walls than those of the lateral cells, and consequently exhibit greater resistance to edge applied compressive forces than the lateral cells.

The lateral cells are attached to the brace cells, and fill the remaining voids within the door enclosure, on either side of the brace cells.

A pair of sheet panels is preferably glued both to the faces of the door frame and to the exposed edges of the quadrangular cells to form a rigid door panel.

DETAILED DESCRIPTION OF THE PREFERRED EMBODIMENT

Figure 1:
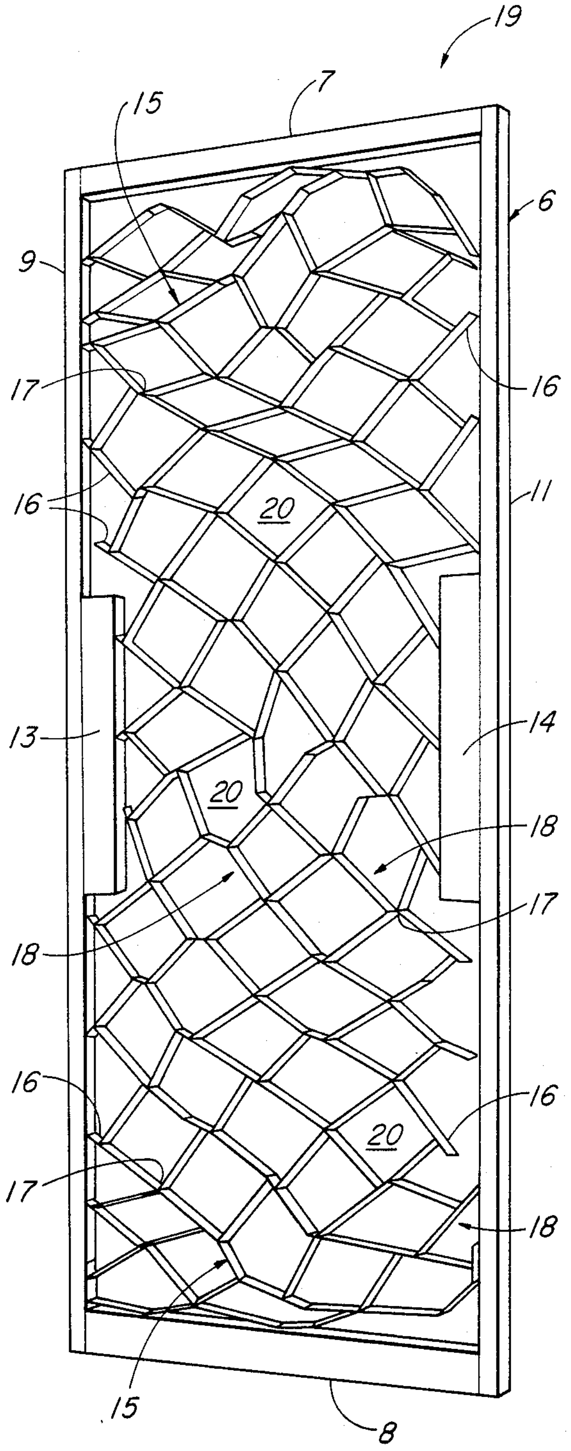
FIG. 1 is an isometric perspective view of a conventional door panel construction, using uniform cell wall dimensions, the front sheet panel being removed for clarity.

Making reference now to FIG. 1, there is afforded an outside frame 6, preferably constructed from lumber elements, including a pair of generally parallel upper and lower end pieces 7 and 8, respectively, as well as a pair of longitudinally extending side pieces 9 and 11, joined to the end pieces at right angled corners to form a rectangular, open center frame. Since all of the pieces of the frame are substantially of the same thickness, the frame defines a rectangular interior void, having a uniform thickness. The frame 6 usually includes between its ends a pair of short blocks 13 and 14, secured to the side pieces 9 and 11, providing a mounting base for a door handle and locking assembly.

In the FIG. 1 arrangement, the interior void is occupied by a conventional "honeycomb" structural void filler 15, assembled from a number of elongated corrugated paperboard strips 16, fastened together at various intersections 17. It is evident that the individual cells 18 within the filler 15 do not assume the same configuration, but rather appear somewhat distorted in various aspects. It is of interest to note that while the cells 18 in FIG. 1 are of different shapes, the cell wall dimension between adjacent intersections 17 is identical throughout the filler 15.

The cell distortion stems primarily from the inherent inability of the strips 16 to withstand even slightly excessive stretching forces when the filler is initially expanded to fill the void. Consequently, uneven and unpredictable distribution of the strips 16 throughout the interior void is a common problem associated with such a strip construction.

The door 19 is completed by affixing a front sheet panel (not shown) and a rear sheet panel 20 over the opposite, front and rear faces of the frame 6 and the parallel, outer edges of the strips 16.

Figure 2:
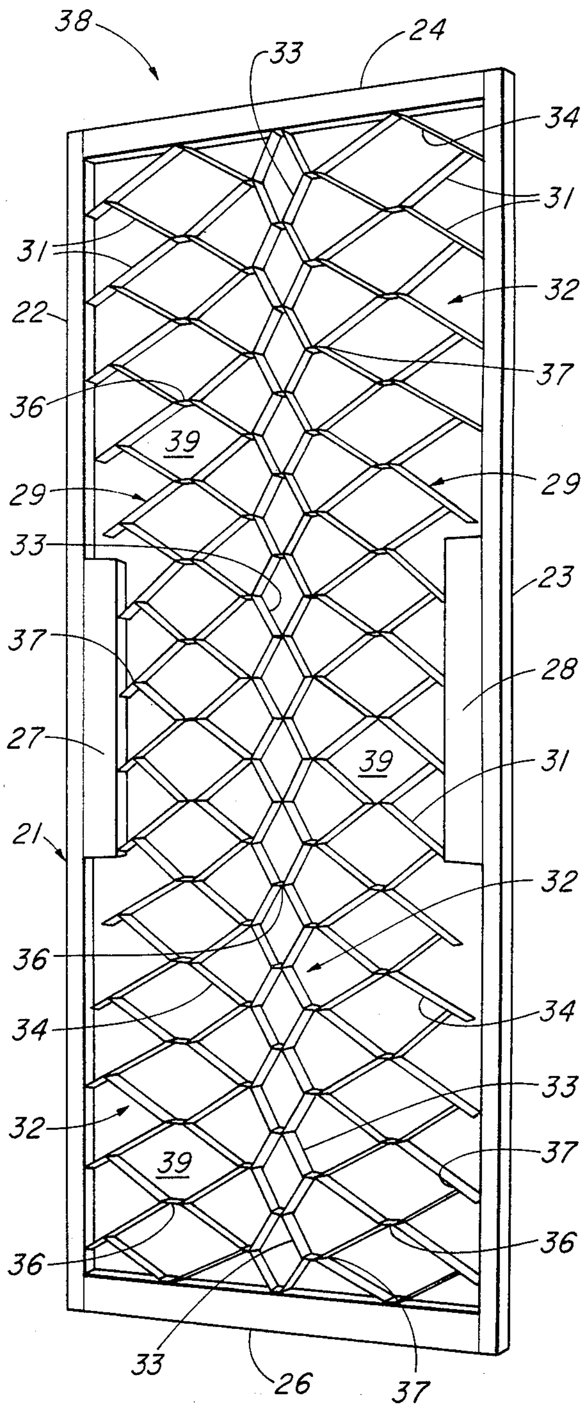
FIG. 2 is an isometric perspective view of the present door panel construction, employing variable cell wall dimensions for additional strength along the longitudinal axis of the door, the front sheet panel being removed for clarity; and, FIG. 3 is a tabulation of two compression tests, comparing prior art structural void filler with the present invention, Test A corresponding to a 12" thick structure and Test B corresponding to a 1⅜" thick structure.

In FIG. 2, the preferred construction of the present invention is disclosed. In this instance, there is a generally rectangular frame 21 comprised of a pair of parallel side members 22 and 23 joined at their ends to a pair of transversely extending upper end member 24 and lower end member 26, also parallel to each other. End members 24 and 26 meet side members 22 and 23 in right angle corners, affording a rectangular frame enclosing a central void. The thickness of all of the end and side members is substantially the same so that the frame 21, in effect, defines a pair of parallel, planar faces. The frame 21 also includes a pair of opposing, internally mounted blocks 27 and 28 for the mounting of locks and other hardware.

The void embraced by the frame 21 is largely filled by a structural void filler 29, formed by a plurality of strips 31. Constructed preferably from corrugated paperboard material, the strips 31 have elongated parallel edges spaced the same dimension as the distance between the opposite faces of the frame. Accordingly, the depth of the structural void filler 29 corresponds to the thickness of the surrounding frame 21.

As shown in FIG. 2, each strip 31 extends from the side member 22 to the opposing side member 23, and is folded and attached to the upper and lower adjacent strips 31 to form a plurality of quadrangular cells 32, including brace cells 33 and lateral cells 34. Each of the quadrangular cells 32 has apexes 36 and corners 37.

The apexes of the brace cells 33 are arranged to form a centrally positioned line of brace cells, extending longitudinally from the upper end member 24 to the lower end member 26. It is important to note that the apex to corner dimension of the brace cells 33 is characteristically shorter than the apex to corner dimension of the lateral cells 34. As the void filler 29 reaches a fully expanded state as shown in FIG. 2, the diamond-shaped brace cells are unable to stretch any farther longitudinally and act as a limit stop. In effect, this prevents the lateral cells 34 from distorting and causing the unequal and unpredictable distribution of supportive strip material shown in FIG. 1.

A second consequence of the reduced apex to corner dimension, or cell wall size, is a significant increase in the concentration of edgewise strip material along the longitudinal line of the brace cells 33. As will become more apparent herein, the series of short walled brace cells 33 affords in effect a strong, stiff or rigid backbone which supports the weakest portion of the structure.

In addition, lateral cells 34 are positioned on either side of a respective brace cell 33. Each lateral cell 34 has an inner corner connected to the adjacent corner of the brace cell, and the upper and lower apexes of each lateral cell are attached to respective apexes of superjacent and subjacent lateral cells. As illustrated in FIG. 2, the two lines of lateral cells 34 extend longitudinally from the upper end member 24 to lower end member 26.

Completing the door 38, a rear sheet panel 39 and a front sheet panel (not shown) abut and are secured to the opposite faces of the frame 21 and to the parallel edges of the strips 31. The corrugated paperboard used to construct the strips 31 has flutes oriented in a direction normal to the planes of the front and rear sheets, and therefore provides the desired degree of strength and rigidity to resist compressive or impact forces imposed upon the door panels. However, it is the strategic distribution of supportive strip material in the present invention which provides improved door strength over known prior art designs.

As has been mentioned previously, the largely unsupported central portion of a hollow door is the region least able to withstand destructive blows. By providing a line of relatively stronger brace cells within this weak region, the present invention largely overcomes the strength deficiencies of prior art designs. This additional cell strength is attained by reducing the apex to corner cell wall dimension in the brace cells, thereby increasing the amount of edgewise paperboard supporting a given surface area of panel sheeting. While compression tests have confirmed that brace cells so designed and strategically placed will increase the overall strength of a structural panel, the increase in strength for a thin panel or door construction is greater than would normally be expected.

Making reference to FIG. 3, the conditions and the results of compression tests conducted for two structural void fillers of different thicknesses are shown. In Test A, two 3′ square structural void fillers, each 12″ deep, and constructed from 8 ply corrugated paperboard, were tested for maximum compressive strength. The filler thickness and material correspond generally to that employed for structural void fillers used as dunnage while shipping articles of freight. The prior art filler used a standard honeycomb cell construction, in which each cell had an identical apex to corner, or cell wall dimension of 9″. The other void filler, constructed in accordance with the teachings of the present invention, used the combination of strategically placed brace cells having a 7.25″ cell wall, and lateral cells having a 10.25″ cell wall dimension.

The filler using the brace cell construction exhibited a 6% increase in strength over the filler using the conventional, uniform cell construction. Since the compressive force was applied over the entire 9′ square surface area, the smaller and stronger brace cells were able to withstand a greater amount of force before collapsing than were the 9″ cells.

In Test B, a similar comparison was conducted using 3′ square structural void fillers, each $1\frac{1}{8}$″ deep and constructed from 18 ply corrugated paperboard. The thickness and the material of the panels in Test B agree with those normally associated with fillers for hollow doors. In this instance, the prior art filler also used the conventional honeycomb cell construction, but the cell wall dimension of each cell was only 5.5″, the standard cell wall size for the structural filler in a hollow door. The remaining void filler used a centrally positioned line of brace cells having 4″ cell walls, straddled on either side by lateral cells having 6″ cell walls.

The filler construction making use of the 4″ brace cells showed a 28% improvement in strength over the conventional, prior art construction. In other words, in going from a void filler construction for dunnage to a void filler construction for hollow doors, the use of brace cells affords an increase in strength over prior art construction which escalates from 6% to 28%. It is believed that this unexpected and beneficial result stems from the substantial reduction in brace cell size when comparing Test B (4″ brace cell) to Test A (7.25″ brace cell).

It is also significant to note that the increase in strength of the fillers using brace cells was achieved without using more corrugated paperboard material than that used in the conventional construction. Thus, the present invention affords higher resistance to compressive forces through reducing cell wall dimensions within a strategic region, rather than resorting to the costlier alternative of merely adding more structural material.

We claim:

1. A door panel construction comprising:

a. a rectangular frame, including a pair of side members parallel to each other, and upper and lower end members also parallel to each other, all of said members being of substantially the same predetermined thickness, having their faces lying in parallel planes, and being joined respectively at the frame corners;

b. a structural void filler disposed within said frame, said void filler including a plurality of individual strips extending substantially between said pair of side members and having uninterrupted parallel edges establishing a filler depth substantially equal to said predetermined thickness, said strips being formed and respectively interconnected to define a plurality of quadrangular cells having upper and lower apexes and lateral corners, said quadrangular cells including brace cells and lateral cells, said brace cells having a shorter apex to corner cell wall dimension than the corresponding apex to corner cell wall dimension of said lateral cells and being assembled apex to apex in a centrally positioned line extending longitudinally from said upper end member to said lower end member, said lateral cells extending between said brace cells and said side members, said corners of said lateral cells being interconnected to a respective adjacent one of said brace cells, said brace cells being adapted to resist greater edgewise compressive forces than said lateral cells; and c. a pair of sheet panels, abutting and secured to the opposite faces of said frame and to said parallel edges of said strips.

2. A door panel as in claim 1 in which the ratio between the apex to corner cell wall dimension of said brace cells and the apex to corner cell wall dimension of said lateral cells is approximately 1 to 1.5.

3. A door panel as in claim 1 in which said brace cells are diamond-shaped and elongated along their coincident axes.

4. A door panel as in claim 1 including door fixture mounting blocks extending inwardly from a portion only of each of said side members and impinging slightly upon the outer said corners of adjacent said lateral cells.

* * * * *